(12) United States Patent
Baron

(10) Patent No.: US 10,683,026 B2
(45) Date of Patent: Jun. 16, 2020

(54) TRICYCLE TOW PLATFORM

(71) Applicant: SMART TRIKE MNF PTE LTD., Singapore (SG)

(72) Inventor: Yoram Baron, Moshav nir Israel (IL)

(73) Assignee: Smart Trike MNF PTE Ltd., Singapore (SG)

( * ) Notice: Subject to any disclaimer, the term of this patent is extended or adjusted under 35 U.S.C. 154(b) by 0 days.

(21) Appl. No.: 16/173,016

(22) Filed: Oct. 29, 2018

(65) Prior Publication Data

US 2019/0161105 A1    May 30, 2019

Related U.S. Application Data

(60) Provisional application No. 62/590,772, filed on Nov. 27, 2017.

(51) Int. Cl.
  *B62B 5/08* (2006.01)
  *B62B 9/28* (2006.01)
  *B62K 9/02* (2006.01)

(52) U.S. Cl.
  CPC ............... *B62B 5/082* (2013.01); *B62B 5/087* (2013.01); *B62B 9/28* (2013.01); *B62K 9/02* (2013.01)

(58) Field of Classification Search
  CPC ................................ B62B 5/087; B62B 5/082
  See application file for complete search history.

(56) References Cited

U.S. PATENT DOCUMENTS

| | | | |
|---|---|---|---|
| 2,980,442 A * | 4/1961 | Krokos et al. | B62K 27/00 280/204 |
| 3,000,645 A | 9/1961 | Schmidt | |
| 7,300,061 B1 * | 11/2007 | Omstead | A01D 67/00 280/32.7 |
| 9,321,475 B2 | 4/2016 | Weber et al. | |
| 2007/0114738 A1 | 5/2007 | Jones et al. | |
| 2015/0266494 A1 | 9/2015 | Weber et al. | |
| 2015/0314660 A1 | 11/2015 | Lee et al. | |

FOREIGN PATENT DOCUMENTS

CN    106103261 A    11/2016

* cited by examiner

*Primary Examiner* — John D Walters
*Assistant Examiner* — James J Triggs
(74) *Attorney, Agent, or Firm* — Roach, Brown, McCarthy & Gruber, P.C.; Kevin D. McCarthy

(57) ABSTRACT

The present invention relates to a sibling board, attachable to a tricycle, for accommodating a child, comprising: (a) a foot board; (b) at least one latch for attaching said sibling board to a tricycle; and (c) at least one rear wheel; wherein said sibling board is connectable to the rear of a tricycle.

6 Claims, 10 Drawing Sheets

TRICYCLE TOW PLATFORM

TECHNICAL FIELD

The present invention relates to sibling boards. More particularly, to a sibling board that can be attached to a riding vehicle.

BACKGROUND

Whether used for transportation or recreation, riding vehicles may be used for riders of different sizes and capabilities. Some riding vehicles, such as strollers are configured to be pushed from behind, by an individual, such as an adult pushing a child. Nevertheless, the riding vehicles are typically designed to accommodate only one rider.

CN106103261A discloses a riding board apparatus configured to be mounted to a stroller. The disclosed riding board apparatus includes a platform, at least one mounting arm extending from the platform, and a seat mounted onto the platform and is configured to be convertible between a sitting configuration and a stowable configuration. Nevertheless, the proposed riding board is complicated to mount and handle.

It would therefore be desired to propose a system void of these deficiencies.

SUMMARY

It is an object of the present invention to provide an attachable/detachable sibling board, for a tricycle, for accommodating another child, in addition to the rider of the tricycle.

It is another object of the present invention to provide a sibling board for a tricycle which can be folded together with the tricycle.

It is still another object of the present invention to provide a sibling board for accommodating a sitting or standing child.

Other objects and advantages of the invention will become apparent as the description proceeds.

The present invention relates to a sibling board, attachable to a tricycle, for accommodating a child, comprising: (a) a foot board; (b) at least one latch for attaching said sibling board to a tricycle; and (c) at least one rear wheel; wherein said sibling board is connectable to the rear of a tricycle.

Preferably, the sibling board further comprises a detachable chair connected by a chair base to the foot board.

Preferably, the sibling board is folded together with the tricycle.

Preferably, the rear wheel is a swivel wheel.

Preferably, the sibling board is folded to the tricycle.

Preferably, the sibling board is capable of being attached to a foldable tricycle when said tricycle is in the trolley folded position.

BRIEF DESCRIPTION OF THE DRAWINGS

The accompanying drawings, and specific references to their details, are herein used, by way of example only, to illustratively describe some of the embodiments of the invention.

In the drawings.

DETAILED DESCRIPTION

Hereinafter, parts, elements and components that are depicted in more than one figure are typically referenced by the same numerals.

The terms of "front", "rear", "down", "up", "bottom", "upper", "horizontal", "vertical", "right", "left" or any reference to sides or directions are used throughout the description for the sake of brevity alone and are relative terms only and not intended to require a particular component orientation.

Figure 1:
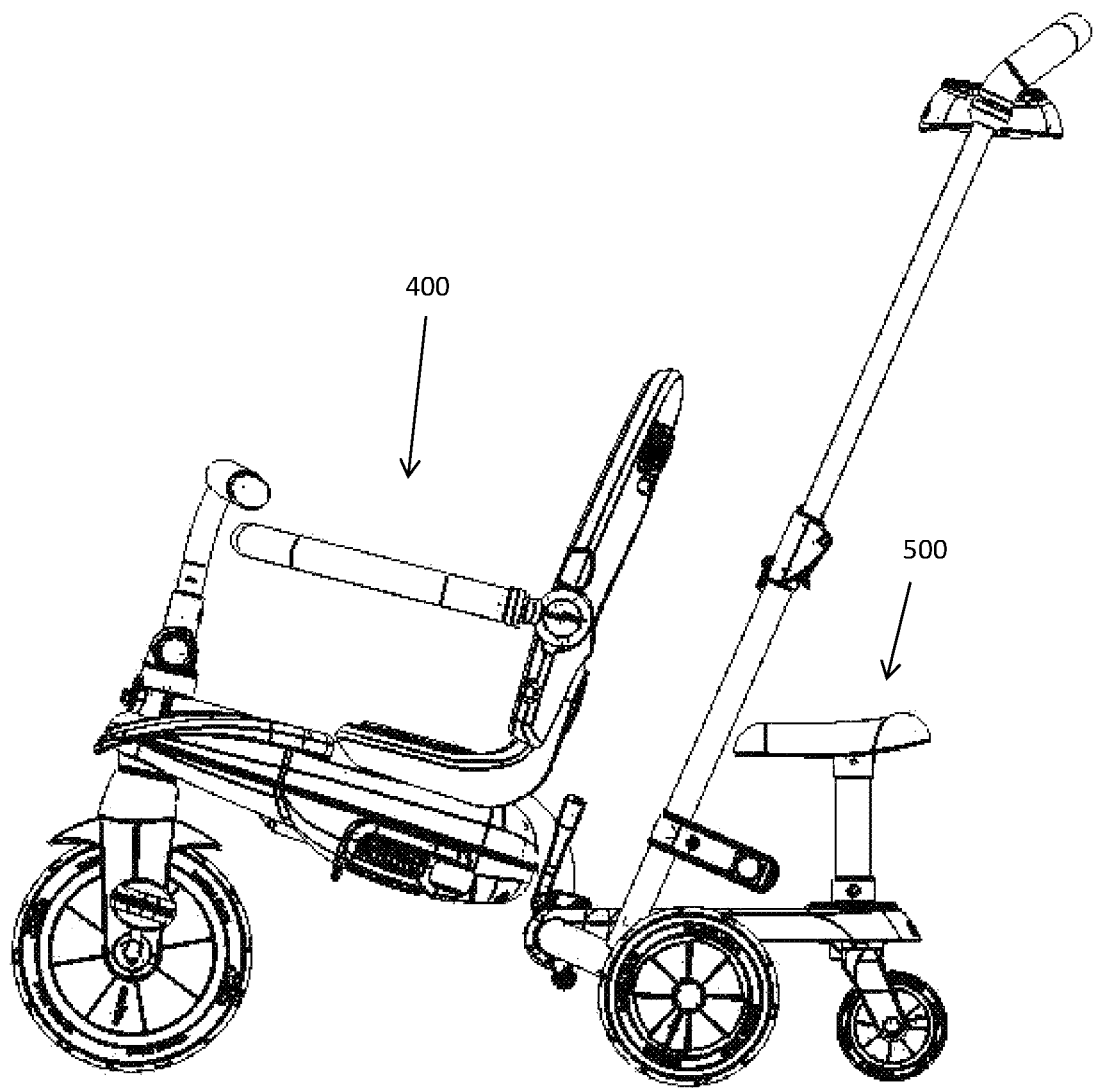
FIG. 1 is a diagram of a sibling board attached to a tricycle, according to an embodiment of the invention.

FIG. 1 is a diagram of a sibling board attached to a tricycle, according to an embodiment of the invention. In this diagram the sibling board 500 is attached to the rear of tricycle 400. For example, when there is a need to carry another child, in addition to the child sitting in the tricycle, the sibling board 500 may be attached to the rear of the tricycle 400 and the child may rest, on the sibling board 500, while the parent is pushing them both. In another embodiment the sibling board 500 may be attached, to the rear of the tricycle, for allowing the rider of the tricycle to lead another child while the rider propels the tricycle forward. The sibling board 500 may also be detached from the tricycle 400 once there is no need for it anymore.

Figure 2:
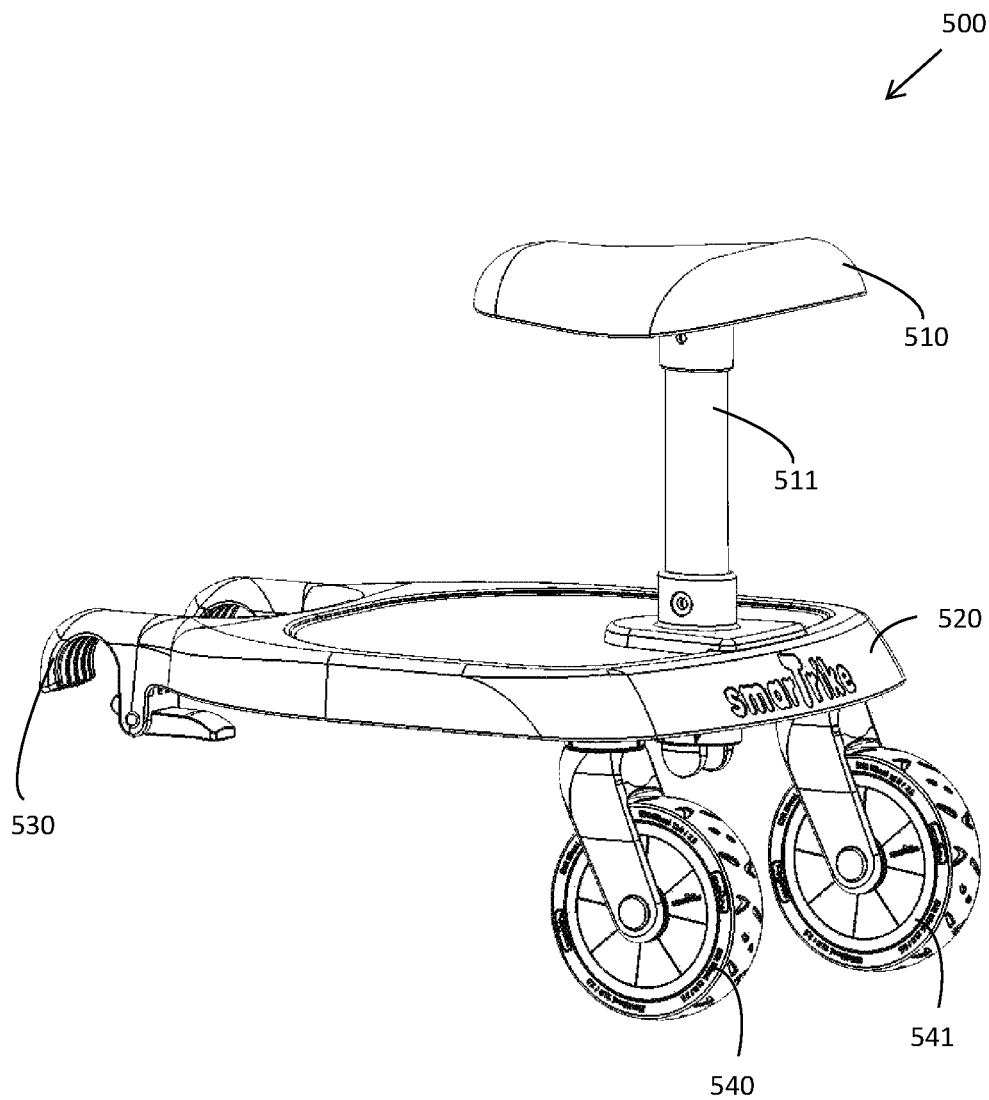
FIG. 2 is a diagram of the sibling board, according to an embodiment of the invention.

FIG. 2 is a diagram of the sibling board, according to an embodiment of the invention. The sibling board 500 may have a foot board 520 for feet resting. The terms "foot board" and "board" may be used interchangeably hereinafter. The sibling board 500 may be attached at its front side by latch 530 to the rear of a tricycle. The latching mechanism will be described in greater details in relations to FIG. 4. The rear part of board 520 may have one or more wheels such as wheel 540. In one embodiment, the board 500 has 2 rear wheels 540-541. In one embodiment, the rear wheel(s) are swivel, i.e. caster, wheel(s), for aligning with the direction of the movement of the tricycle leading the board 500. The sibling board 500 may have an optional chair 510 and chair base 511 which may be connected to the foot board 520. Different chairs, chair bases, designs and sizes may be used for accommodating a child. In one embodiment, the chair 510 and the chair base 511 are attachable and detachable to/from the board 520, as will be described in greater detail in relations to FIG. 3-4. The sibling board 500 may be used for a sitting child and/or a standing child.

Figure 3:
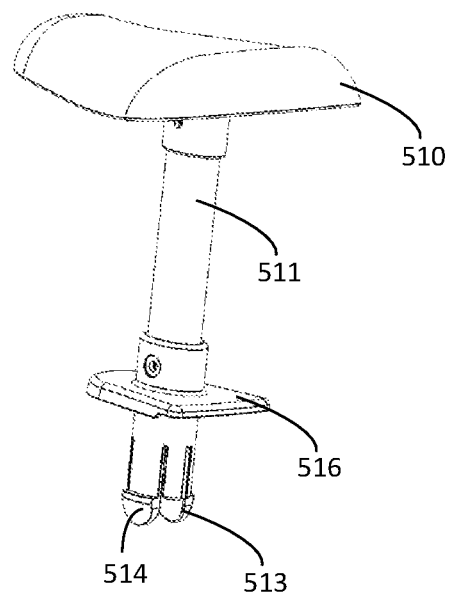
FIG. 3 is a diagram of the chair and the chair base of the sibling board, according to an embodiment of the invention.
Figure 4:
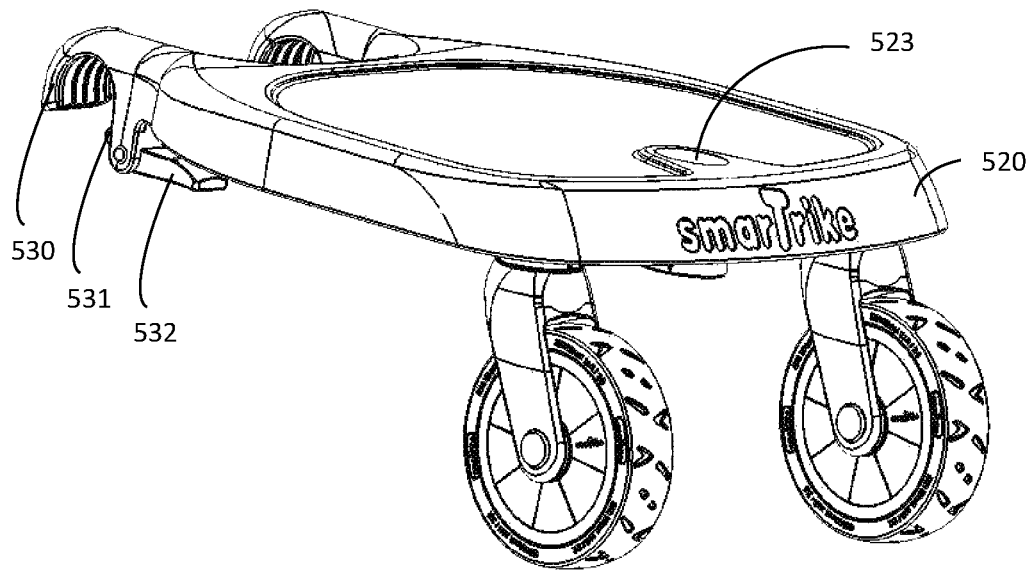
FIG. 4 is a diagram of the of the sibling board without the chair and the chair base, according to an embodiment of the invention.

FIG. 3 is a diagram of the chair and the chair base of the sibling board, as described in relations to FIG. 2, according to an embodiment of the invention. FIG. 4 is a diagram of the of the sibling board without the chair and the chair base, as described in relations to FIG. 2, according to an embodiment of the invention. The chair base 511 may have a snap-fit mechanism at its bottom, or any other mechanism, for attaching and holding firmly the chair base 511 on the board 520. In one embodiment the snap-fit mechanism is a torsional snap-fit, where the bottom part of the chair base 511 is inserted and snap-fitted into the hole 523 in the board 520. In one embodiment, the base 511 may also have a stabilizer 516 which may be placed on the entrance of the hole 523, when the chair base is snap-fitted into board 520. For example, the snap-fit mechanism may have 2 outer lobes, such as lobes 513-514, where the lobes, of chair base 511, may slide into hole 523 of board 520 and snap-fit, into holding the board 520, once the stabilizer 516 has reached the proximity of the hole 523 of the board 520. For detaching the chair 510 and chair base 511 from board 520, the lobes 513-514 may be forced towards each other and then the base 511 may be pulled out and slid away from the board 520. In one embodiment the chair base 511 height is adjustable for allowing the user to change the chair 510 height. In one embodiment the chair base 511 height is telescopically adjustable as known in the art.

The foot board 520, as described in relation to FIG. 4, may have at least one latching mechanism for attaching the board 520 to the rear of a tricycle. In one embodiment the board 520 has 2 latching mechanisms. In one embodiment the latching mechanism comprises a latch 530 and a lock which secures the board 530 to the tricycle. In one embodiment the lock comprises a protrusion 531. In one embodiment the lock comprises a protrusion 531 and a lever 532 which may be formed as a single part. The protrusion 531 may be regulated to its place by a spring (not shown) which pushes the protrusion 531 downwards. Once the user wishes to attach the board 520 to the tricycle he can snap the latch 530 over the rear of the frame, or the rear support, of a tricycle, where the protrusion 531 may move upwards and then return downwards, regulated by its spring, for locking the latch 530 over the tricycle and preventing a spontaneous release of the board 520 from the tricycle. When the user wishes to release the board from the tricycle he may push the lever 532 downwards, thus pulling the protrusion 531 upwards, and then pull the latch 530 upwards while disengaging the board from the tricycle. In other embodiments, other known latching mechanisms may be used which may use different a different latch(s) for attaching other the board 520 to a tricycle.

Figure 5:
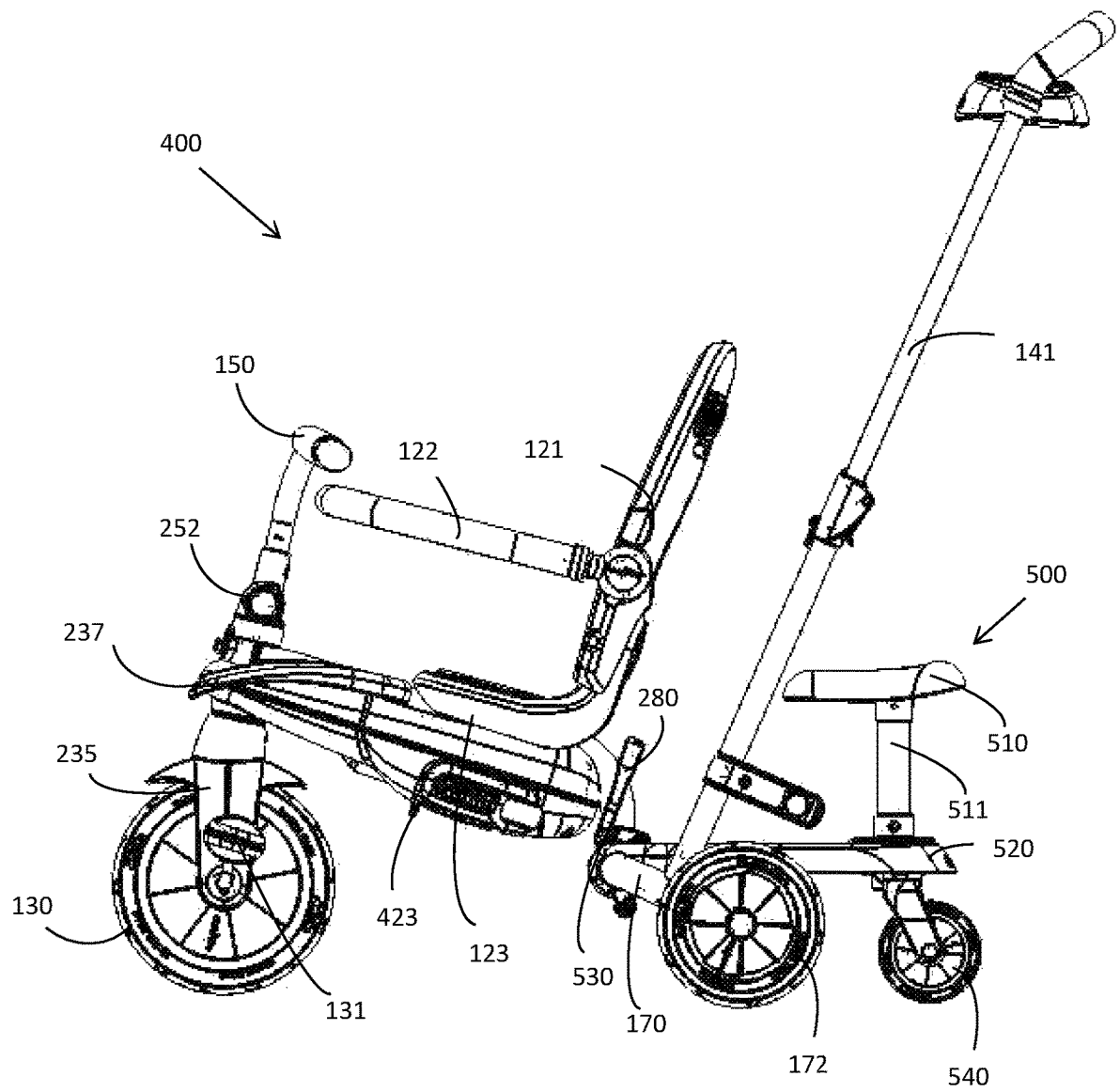
FIG. 5 is a diagram of a sibling board attached to a tricycle, according to an embodiment of the invention.
Figure 6:
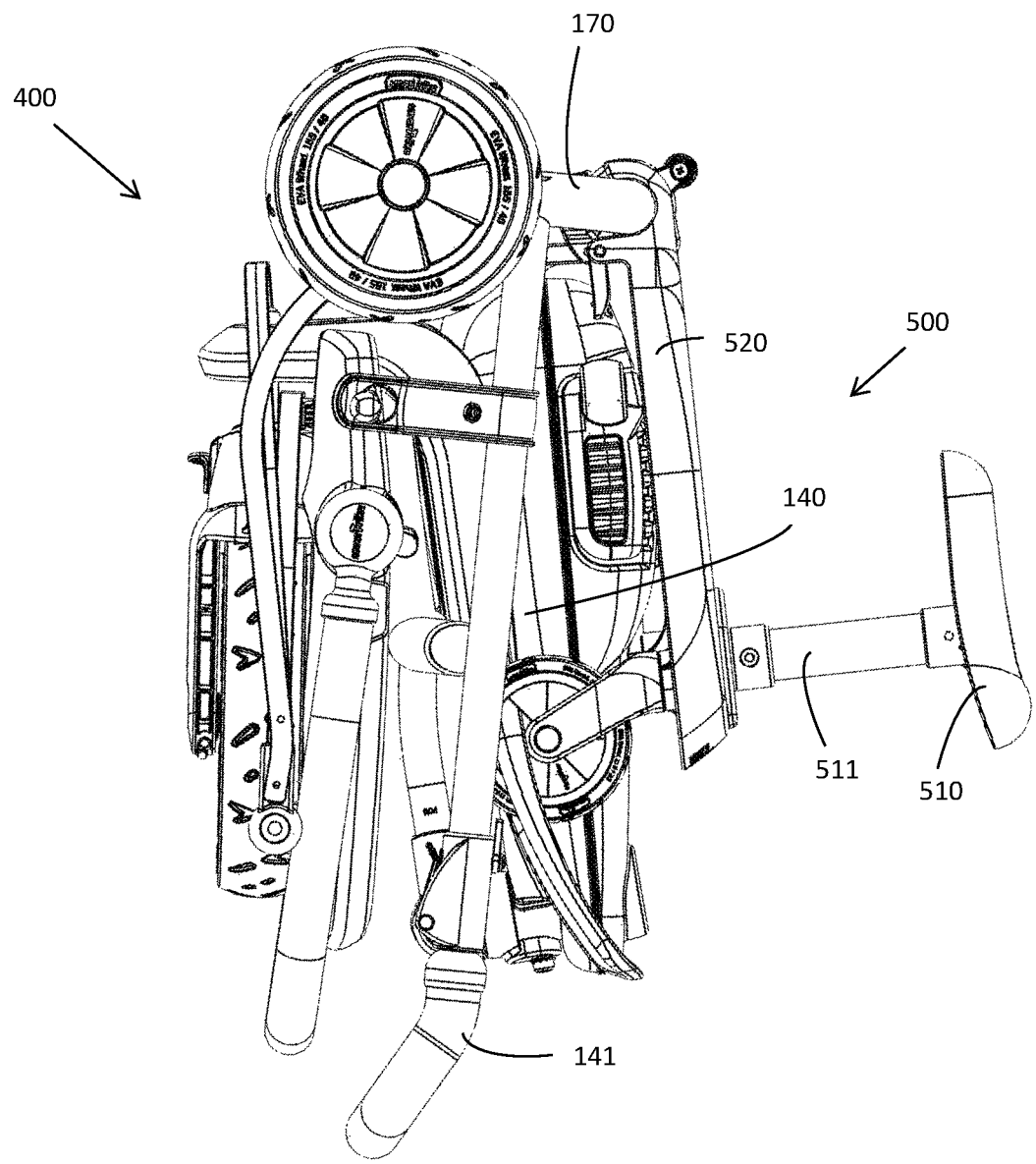
FIG. 6 is a right view diagram depicting the tricycle and the sibling board folded together in the folded position, according to an embodiment.

FIG. 5 is a diagram of a sibling board attached to a tricycle, as described in relations to FIG. 1, according to an embodiment of the invention. The depicted tricycle 400 may be a foldable tricycle, such as depicted in FIG. 6, for example. The tricycle 400 may be propelled by a pedaling rider, or may be propelled by an attendant, who pushes the tricycle. The tricycle may have a foldable seat which may comprise a sitting chair 123 and a foldable back support 121 for supporting the back of the rider. In one embodiment, a foldable arm rest 122 may be connected to the foldable back support 121. In one embodiment, the foldable arm rest 122 may rotate upwards, when folding, and rotate downwards, when unfolding, until the foldable arm rest 122 rests in an angle where the arm rest 122 is about parallel to chair 123.

The tricycle 400, as depicted in FIG. 5, may have 2 rear wheels, such as rear wheel 172, which may be rotatably supported by a rear support 170. In one embodiment the sibling board 500 may be attached to the rear support 170. In one embodiment, tricycle 400 may have at least one front wheel 130 with a front wheel axis and a pair of pedals, such as pedal 131, where each of the pedals may be configured for connection about the front wheel axis to rotate the front wheel 130. In one embodiment, the pedals may be foldable pedals. In another embodiment, the pedals may be detachable pedals.

In one embodiment, the tricycle 400 may have a foldable canopy (not shown), for protecting the rider from the sun or rain. In some embodiments the hinges of the canopy may be detachable and may be used for detaching or attaching the canopy from/to the back support 121.

Embodiments of the tricycle 400, depicted in FIG. 5, may also include a rider handle 150 and a fork 235, for rotatably supporting the front wheel 130. The fork may be made of metal, plastic, resin, or any other rigid material. In one embodiment, the front wheel 130 and its fork 235 may be detachable from the main body of the tricycle 400. In one embodiment, the front wheel 130 and its fork 235 may be detachable from the main body of the tricycle 400 by pushing a button of a snap-in-place part. In another embodiment, the front wheel 130 and/or its fork 235 may be foldable in relations to the main body of the tricycle 400. In one embodiment, the rider handle 150 may be foldable, where the base mechanism 252 may be rotatable and may fold the rider handle 150 when the tricycle is in the folded position. In one embodiment, the base mechanism 252 may have a snap in place button where a push on the button may allow the folding of the handle 150. In another embodiment, the base mechanism 252 may have a fastener where the fastener may be opened for folding the handle 150. Other known mechanisms may be used as well for folding the handle 150.

In one embodiment, the tricycle 400 may have a legs rest such as leg rest 237, in FIG. 5, for younger children, such as children between 9-12 months. In one embodiment, a younger child may rest his legs on the leg rest 237 when the tricycle is steered and propelled by an attendant, who pushes the tricycle from behind.

In one embodiment, the tricycle 400, as depicted in FIG. 5, may have a foldable foot rest such as foot rest 423 for older children, such as children above 12 months. In one embodiment, the foldable foot rest 423 may be opened (not shown) for allowing an older child to rest his feet on the foot rest 423 when the tricycle is steered and propelled by an attendant, who pushes the tricycle from behind, using parental handle 141 for example.

In one embodiment, a folding grip 280 may be pulled upwards for folding the tricycle 400. In one embodiment, a folding grip 280 may be pulled upwards for folding the tricycle 400 together with the sibling board 500. The folding mechanism will be described in greater detail in relations to FIG. 6. In one embodiment, the user can pull the grip 280 and fold the tricycle 400 together with the sibling board 500 in one motion. For example, when the grip 280 is pulled upwards the main body, of the tricycle, and the rear support 170 may each rotate downwards, due to gravity, effectively causing the tricycle 400 to fold, and causing the sibling board 500 to fold with it, as depicted in FIG. 6 for example. In one embodiment, when the grip 280 is pulled upwards, a ledge is pushed and a bolt is knocked inwards, effectively allowing the main body of the tricycle to rotate in relations to the rear support 170. Thus, when the bolt is pushed inwards while the grip 280 is pulled upwards, the main body and the rear support 170 may each rotate downwards, due to gravity. However, for opening and locking the tricycle 400 in the open position, the tricycle 400 should be opened and the grip 280 should be released.

Figure 7:
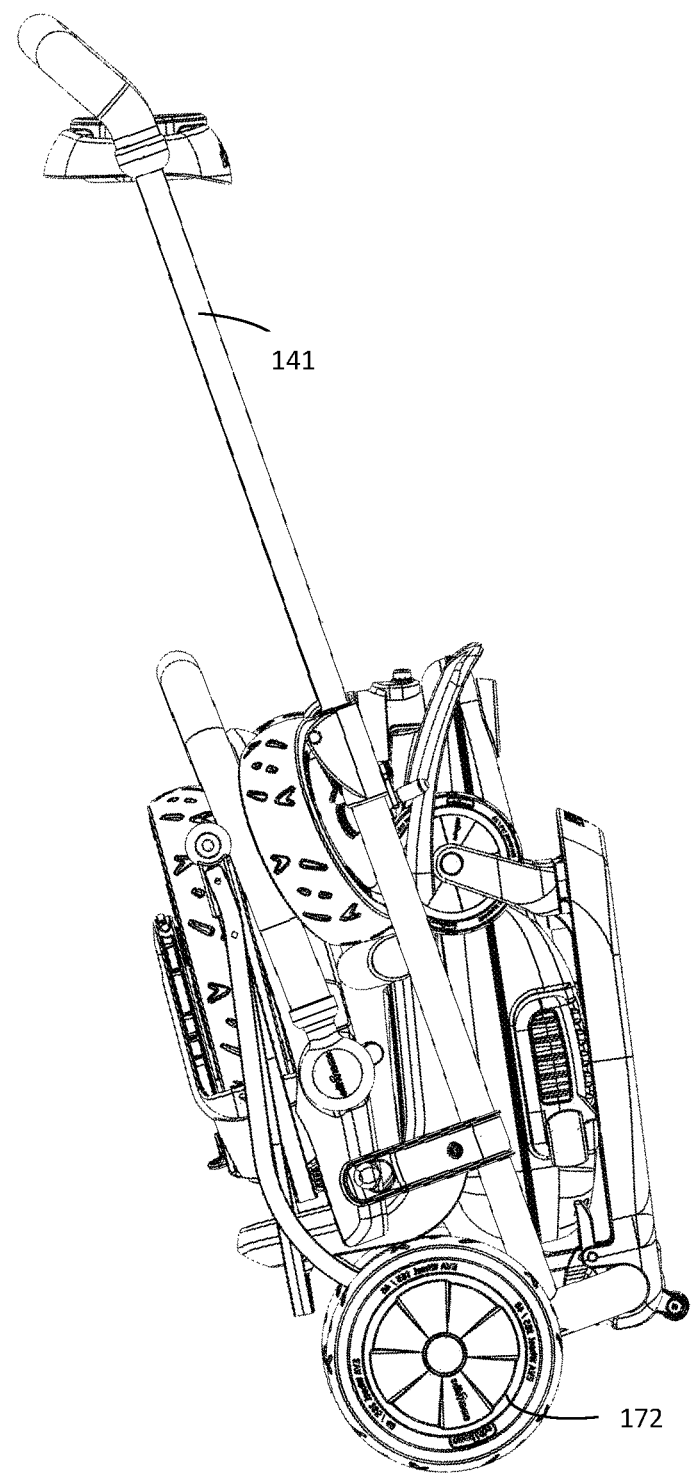
FIG. 7 is a side view diagram depicting the foldable tricycle and sibling board in a trolley like folded position, according to another embodiment of the invention.

FIG. 6 is a right view diagram depicting the tricycle and the sibling board folded together in the folded position, according to an embodiment. In this folded position, the parental handle 141 may be rotated under the tricycle 400 toward the front of the tricycle 400, effectively rotating the attached rear support 170 in relations to the main body of the tricycle 400. Thus, in one embodiment, the parental handle 141 and the attached rear support 170 are folded in relations to the frame 140. In one embodiment the tricycle 400 may be folded together with all its depicted parts, including its arm rest and its canopy. In one embodiment, the tricycle 400 may be folded together with the sibling board 500. In one embodiment the sibling board 500 may be folded together with the tricycle 400, without the chair 510 and the chair base 511 as depicted in FIG. 7, for example. In one embodiment the chair 510 and the chair base 511 are first detached from the sibling board 500 before folding. In this embodiment, the chair 510 and the chair base 511 may be added, or specifically attached, after folding, to the folded tricycle or folded sibling board 500. In one embodiment the chair base 511 may be a foldable chair base for folding the chair 510 and the chair base 511 closer to the board 520.

In one embodiment, in the folded position, the dimensions of the folded tricycle and the sibling board may be less than 67×51×49 cm. In one embodiment, the total dimensions of the folded tricycle and the sibling board are less than 170 cm. In one embodiment, the total dimensions of the folded tricycle and the sibling board are less than 200 cm. In one embodiment, the total dimensions of the folded tricycle and the sibling board are less than 115 cm. In another embodiment, the total dimensions of the folded tricycle and the sibling board, without the rear wheels, of the tricycle, are less than 160 cm. In one embodiment, in the folded position, the dimensions of the folded tricycle and the sibling board may be between 75×60×55 cm and 60×25×30 cm. In another embodiment, the measurement of the folded tricycle, without the rear wheels and without the front wheel, of the tricycle, and the sibling board, without the chair and chair base, is about 67×32×36. In another embodiment, the measurement of the folded tricycle and the sibling board, without the rear wheels and without the front wheel may be between 59×27×27 cm and 69×35×40 cm.

FIG. 7 is a side view diagram depicting the foldable tricycle and sibling board in a trolley like folded position, according to another embodiment of the invention. In this diagram, the tricycle is depicted with the parental handle 141 folded, as described in relations to FIG. 6, albeit, with the parental handle 141 extended. In this trolley like folded position, the folded tricycle can be rolled on its rear wheels while holding the parental handle 141. This trolley folded position may be handy when the attendant wishes to move and roll the tricycle conveniently while the tricycle is folded. In one embodiment, the folded tricycle may be wrapped up in a protective bag, where the protective bag may have holes for the rear wheels 172 and may have a hole for the parental handle 141. In one embodiment, the front wheel assembly may be removed for easier handling. In one embodiment, the front wheel assembly may be removed and attached at the back of the seat of the tricycle. In another embodiment, the front wheel assembly may be folded for easier handling.

Figure 8:
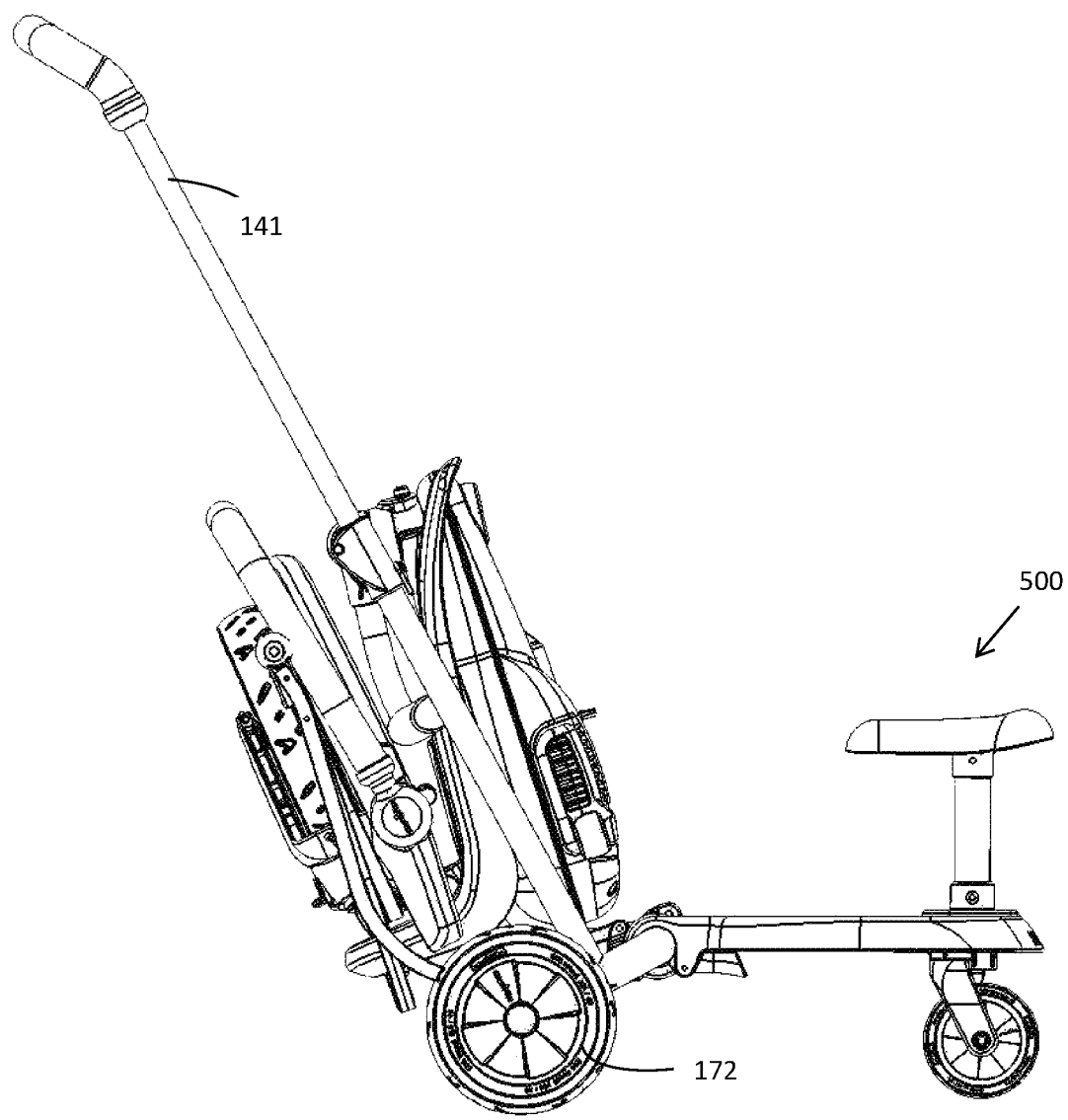
FIG. 8 is a side view diagram depicting the foldable tricycle, in a trolley like folded position, and an attached towable sibling board, according to another embodiment of the invention.

FIG. 8 is a side view diagram depicting the foldable tricycle, in a trolley like folded position, and an attached towable sibling board, according to another embodiment of the invention. In this trolley like folded position, the folded tricycle can be rolled on its rear wheels, such as rear wheel 172, while holding the parental handle 141, while the sibling board 500 is towed behind. This trolley folded position may be handy when the attendant wishes to move a child and roll the tricycle conveniently without opening the tricycle. In one embodiment the sibling board 500 may be towed without a chair.

Figure 9:
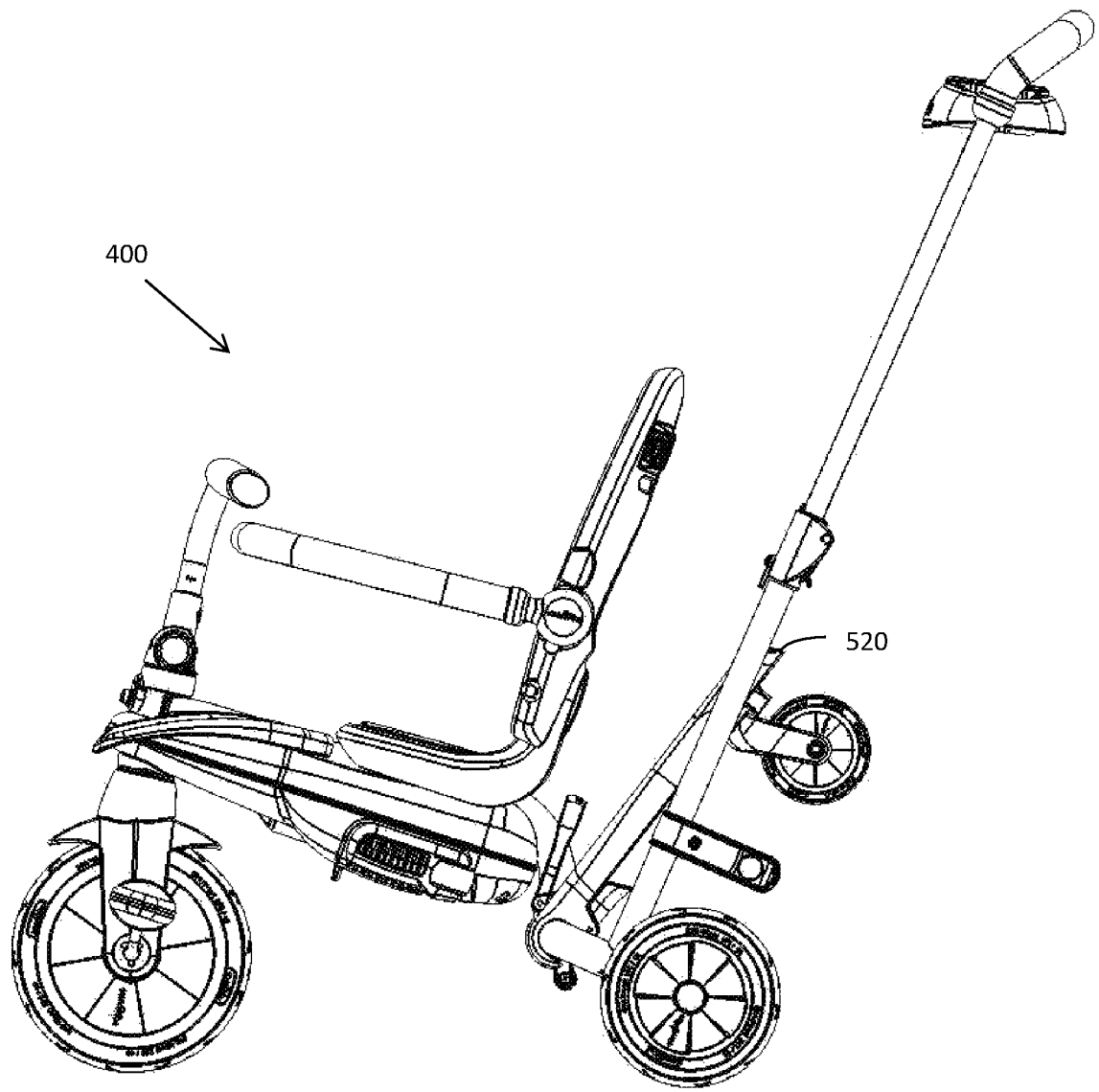
FIG. 9 is a diagram of a tricycle with an attached folded sibling board, according to an embodiment of the invention.

FIG. 9 is a diagram of a tricycle with an attached folded sibling board, according to an embodiment of the invention. In this embodiment, the board 520 may be folded while using the tricycle. This position may be handy when there is no need to drive anther child anymore and the parent wishes to fold the board for an easier walk while pushing the tricycle from behind. The sibling board may be folded with the chair (not shown) and chair base (not shown) or without, as depicted. In one embodiment, the chair and chair base are removed prior to folding the sibling board. In one embodiment a rubber band or a string may be used for holding the folded sibling board. Other techniques may be used for holding and securing the board in the folded position. In one embodiment, the same technique used for holding the folded board to the unfolded tricycle may also be used to hold the folded board to the folded tricycle.

Figure 10:
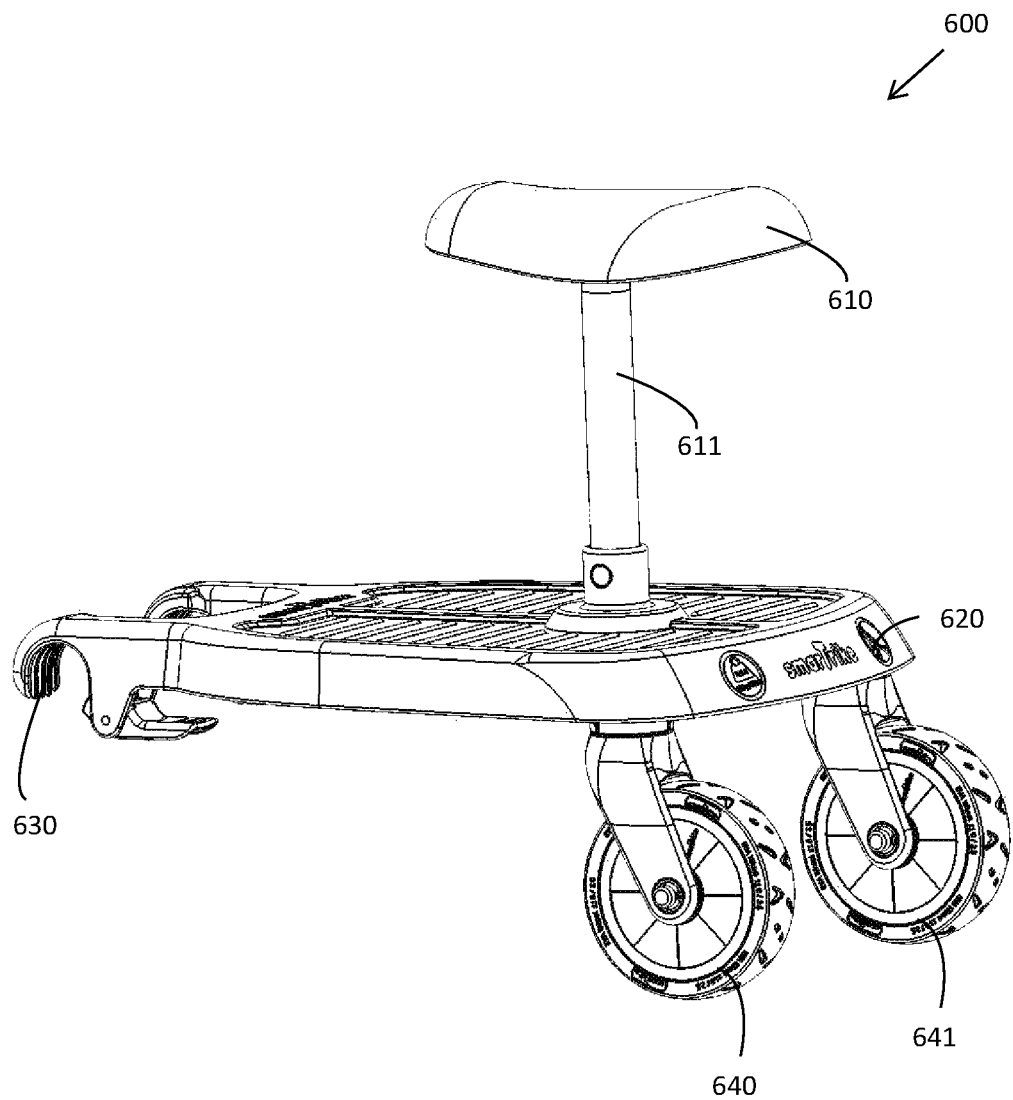
FIG. 10 is a diagram of the sibling board, according to another embodiment of the invention.

FIG. 10 is a diagram of the sibling board, according to another embodiment of the invention. The sibling board 600 may have a foot board 620 for feet resting. The sibling board 600 may be attached at its front side by latch 630 to the rear of a tricycle. The rear part of board 620 may have one or more wheels such as wheel 640. In one embodiment, the board 600 has 2 rear wheels 640-641. In one embodiment, the rear wheel(s) are swivel, i.e. caster, wheel(s), for aligning with the direction of the movement of the tricycle leading the board 600. The sibling board 600 may have an optional chair 610 and chair base 611 which may be connected to the foot board 620. Different chairs, chair bases, designs and sizes may be used for accommodating a child. In one embodiment, the chair 610 and the chair base 611 are attachable and detachable to/from the board 620. The sibling board 600 may be used for a sitting child and/or a standing child. In another embodiment the sibling board 600 may be manufactured and sold without a chair and without a chair base.

Figure 11:
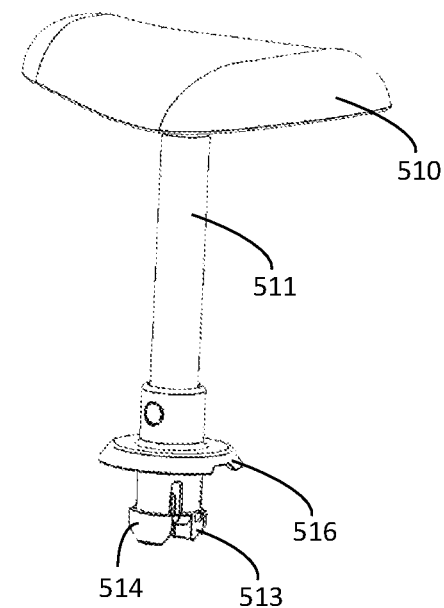
FIG. 11 is a diagram of the chair and the chair base of the sibling board, according to another embodiment of the invention.
Figure 12:
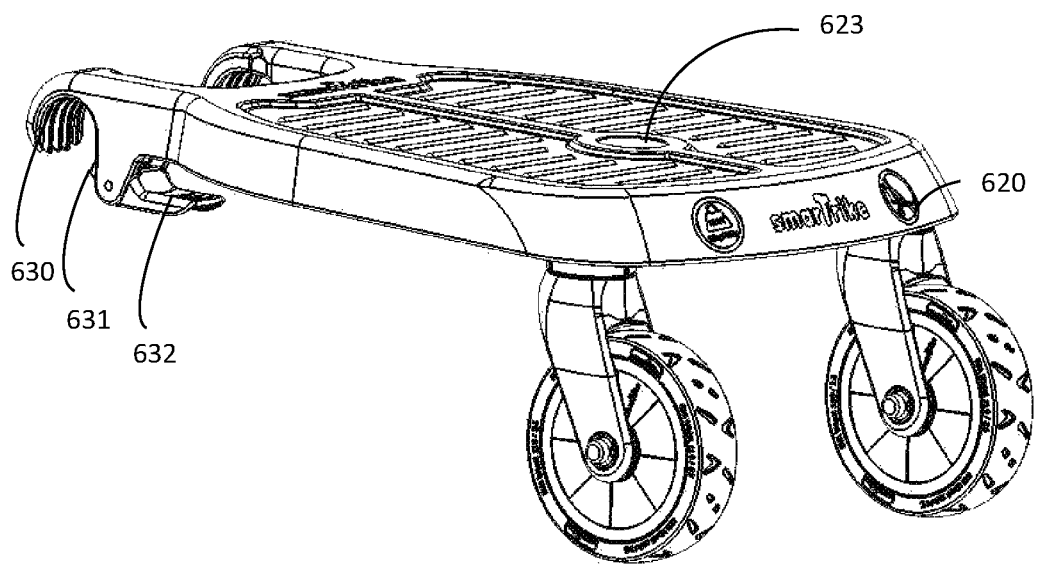
FIG. 12 is a diagram of the of the sibling board without the chair and the chair base, according to an embodiment of the invention.

FIG. 11 is a diagram of the chair and the chair base of the sibling board, as described in relations to FIG. 10, according to another embodiment of the invention. FIG. 12 is a diagram of the of the sibling board without the chair and the chair base, as described in relations to FIG. 10, according to an embodiment of the invention. The chair base 611 may have a snap-fit mechanism at its bottom, or any other mechanism, for attaching and holding firmly the chair base 611 on the board 620. In one embodiment the snap-fit mechanism is a torsional snap-fit, where the bottom part of the chair base 611 is inserted and snap-fitted into the hole 623 in the board 620. In one embodiment, the base 611 may also have a stabilizer 616 which may be placed on the entrance of the hole 623, when the chair base is snap-fitted into board 620. For example, the snap-fit mechanism may have 2 outer lobes, such as lobe 613, where the lobes, of chair base 611, may slide into hole 623 of board 620 and snap-fit, into holding the board 620, once the stabilizer 616 has reached the proximity of the hole 623 of the board 620. For detaching the chair 610 and chair base 611 from board 620, the lobes 613-614 may be forced towards each other and then the base 611 may be pulled out and slid away from the board 620. In one embodiment the sibling board may be manufactured and sold without a chair, without a chair base, and without the hole 623.

The foot board 620, as described in relation to FIG. 12, may have at least one latching mechanism for attaching the board 620 to the rear of a tricycle. In one embodiment the board 620 has 2 latching mechanisms. In one embodiment the latching mechanism comprises a latch 630 and a lock which secures the board 630 to the tricycle. In one embodiment the lock comprises a protrusion 631. In one embodiment the lock comprises a protrusion 631 and a lever 632 which may be formed as a single part. The protrusion 631 may be regulated to its place by a spring (not shown) which pushes the protrusion 631 downwards. Once the user wishes to attach the board 620 to the tricycle he can snap the latch 630 over the rear of the frame, or the rear support, of a tricycle, where the protrusion 631 may move upwards and then return downwards, regulated by its spring, for locking the latch 630 over the tricycle and preventing a spontaneous release of the board 620 from the tricycle. When the user wishes to release the board from the tricycle he may push the lever 632 downwards, thus pulling the protrusion 631 upwards, and then pull the latch 630 upwards while disengaging the board from the tricycle. In other embodiments, other known latching mechanisms may be used which may use different a different latch(s) for attaching other the board 620 to a tricycle.

In one embodiment, a tricycle may be folded together with the sibling board 600. In one embodiment the sibling board 600 may be folded together with a tricycle, without its chair 610 and without its chair base 611. In one embodiment the tricycle and the sibling board 600 may be folded together in one motion.

In some embodiments, the tricycle may have a fastener and a pin for holding the tricycle in the folded position, once the tricycle is folded. In one embodiment, the fastener has to be disengaged from the pin prior to opening and unfolding the tricycle.

In one embodiment the tricycle may have a front swivel wheel for allowing the attendant who pushes the tricycle to steer the tricycle left or right. For the sake of brevity, a description is set forth, for the configuration of the front swivel wheel. The central axis of the stem of the fork of the front wheel extends in an offset from rotational axis of front wheel by a distance. In one embodiment, the offset distance is in a range of about 15 mm and 40 mm. In another embodiment, the offset distance is in a range of about 10 mm and 50 mm. As the offset distance decreases with all else equal, so to decreases an ability to turn the tricycle from behind using the parental handle. Thus, in one embodiment, the angle between the stem and the fork is between about 165 and 179 degrees. In one embodiment, the minimum diameter of the stem is at least three times less than the width of the front wheel. This combination of geometries is exemplary of a configuration that may permit an attendant to steer, in a second mode, when the stem axis leads the wheel axis, or may permit the tricycle rider to steer, in a first mode.

The rider handle, in a first mode, may be configured to be rotationally coupled with the stem in a manner permitting a tricycle rider to exert forces on the rider handle and thereby turn the fork, and the rider handle in the second mode, may be configured to be rotationally uncoupled from the stem, preventing forces on the rider handle from turning the fork. Rotational coupling and decoupling of the rider handle from the fork may be accomplished in numerous mechanical ways, and the invention, in its broadest sense, is not limited to any particular mechanical interconnection. Rather, any manner in which the rider handle may be coupled and uncoupled to the fork is considered to fall within the scope and spirit of the invention. Moreover, the location of a coupling decoupling mechanism is not necessarily critical to embodiments of the invention. It may be located between a rider handle assembly and a stem, or it may be located between a stem and a fork.

In one embodiment, the sibling board may be manufactured to be attached to other riding vehicles such as ride-ons. In one embodiment, the sibling board may be manufactured to be attached to other riding vehicles such as strollers.

In other embodiment the sibling board may be used to carry things other than a child. For example, the sibling board may be used for carrying a pet. In one embodiment the sibling board may be used for carrying bags, such as grocery bags. In one embodiment the sibling board may have an additional bag strapped to it for holding any gear.

While the above description discloses many embodiments and specifications of the invention, these were described by way of illustration and should not be construed as limitations on the scope of the invention. The described invention may be carried into practice with many modifications which are within the scope of the appended claims.

The invention claimed is:

1. A sibling board, attachable to a foldable tricycle, and foldable with said foldable tricycle, comprising:
   a foot board for feet resting;
   at least two latching mechanisms for attaching said foot board to said foldable tricycle, where each of said latching mechanism comprises a latch and a lock, which secures said foot board to said foldable tricycle, for connecting said sibling board to the rear of said foldable tricycle;
   at least one rear wheel attached to the rear part of said foot board; and
   wherein said sibling board is foldable together with said foldable tricycle, and wherein the total dimensions, of said folded tricycle and said sibling board, are less than 200 cm.

2. The sibling board according to claim 1, further comprising a detachable chair connected by a chair base to the foot board.

3. The sibling board according to claim 1, where the rear wheel is a swivel wheel.

4. The sibling board according to claim 1, where the sibling board is capable of being attached to the foldable tricycle when said foldable tricycle is in a trolley folded position.

5. The sibling board according to claim 1, where the dimensions of the folded tricycle and the sibling board may be between 75×60×55 cm and 60×25×30 cm.

6. The sibling board according to claim 1, wherein the foldable tricycle has a grip and a user can pull the grip, of the foldable tricycle, and fold, the foldable tricycle together with the sibling board, in one motion.

* * * * *